(12) United States Patent
Hiramatsu et al.

(10) Patent No.: US 7,239,501 B2
(45) Date of Patent: Jul. 3, 2007

(54) DIELECTRIC CERAMIC COMPOSITION AND LAMINATED CERAMIC CAPACITOR

(75) Inventors: Takashi Hiramatsu, Kusatsu (JP); Tomonori Muraki, Yasu (JP)

(73) Assignee: Murata Manufacturing Co., Ltd (JP)

( * ) Notice: Subject to any disclaimer, the term of this patent is extended or adjusted under 35 U.S.C. 154(b) by 0 days.

(21) Appl. No.: 10/560,255

(22) PCT Filed: May 7, 2004

(86) PCT No.: PCT/JP2004/006507

§ 371 (c)(1),
(2), (4) Date: Dec. 12, 2005

(87) PCT Pub. No.: WO2005/003058

PCT Pub. Date: Jan. 13, 2005

(65) Prior Publication Data

US 2006/0139845 A1    Jun. 29, 2006

(30) Foreign Application Priority Data

Jul. 7, 2003    (JP) .............................. 2003-192589

(51) Int. Cl.
*H01G 4/06*    (2006.01)
*C04B 35/00*   (2006.01)

(52) U.S. Cl. .............................. 361/321.4; 361/321.5; 501/138

(58) Field of Classification Search .. 361/321.4–321.5; 501/138–139
See application file for complete search history.

(56) References Cited

U.S. PATENT DOCUMENTS

| 6,243,254 B1 | 6/2001 | Wada et al. |
| 6,310,761 B1 | 10/2001 | Hori et al. |

FOREIGN PATENT DOCUMENTS

| DE | 199 37 999 | 2/2000 |
| JP | 05-009066 | 1/1993 |
| JP | 05-009067 | 1/1993 |
| JP | 05-009068 | 1/1993 |
| JP | 05-194027 | 8/1993 |
| JP | 08-124785 | 5/1996 |
| JP | 2000-58378 | 2/2000 |
| JP | 2001-039765 | 2/2001 |
| JP | 2001-143955 | 5/2001 |

OTHER PUBLICATIONS

Written Opinion of the International Searching Authority dated Jun. 15, 2004.
Japanese Examination Report dated Apr. 11, 2006 (and English translation of same).

*Primary Examiner*—Eric W. Thomas
(74) *Attorney, Agent, or Firm*—Dickstein, Shapiro, LLP.

(57) ABSTRACT

Provided is a dielectric ceramic composition represented by the chemical composition formula: $100 \, (Ba_{1-x}Ca_x)_m TiO_3 + aMnO + bCuO + cSiO_2 + dRe_2O_3$ (wherein coefficients 100, a, b, c, and d each represent a molar amount; and Re represents at least one element selected from Y, Sm, Eu, Gd, Tb, Dy, Ho, Er, Tm, and Yb), wherein m, x, a, b, c, and d satisfy the respective relationships: $0.990 \leq m \leq 1.030$, $0.04 \leq x \leq 0.20$, $0.01 \leq a \leq 5$, $0.05 \leq b \leq 5$, $0.2 \leq c \leq 8$, and $0.05 \leq d \leq 2.5$.

15 Claims, 1 Drawing Sheet

DIELECTRIC CERAMIC COMPOSITION AND LAMINATED CERAMIC CAPACITOR

TECHNICAL FIELD

The present invention relates to a dielectric ceramic composition and a laminated ceramic capacitor. In particular, the present invention relates to a dielectric ceramic composition and a laminated ceramic capacitor capable of reducing the thickness of a dielectric ceramic layer to about 1 μm.

BACKGROUND ART

Known dielectric ceramic compositions are proposed in, for example, Patent Documents 1, 2, 3, and 4.

Nonreducing dielectric porcelain compositions are proposed in Patent Documents 1, 2, and 3. Basically, each of these nonreducing dielectric porcelain compositions principally contain 92.0 to 99.4 mol % of $BaTiO_3$, 0.3 to 4 mol % of $Re_2O_3$ (Re represents at least one rare-earth element selected from Tb, Dy, Ho, and Er), and 0.3 to 4 mol % of $Co_2O_3$, and accessorily contain 0.2 to 4 mol % of BaO, 0.2 to 3 mol % of MnO, and 0.5 to 5 mol % of MgO.

Each of the nonreducing dielectric porcelain compositions can be fired without converting the structure into a semiconductor even under a low oxygen partial pressure and has a dielectric constant of 3,000 or more, and an insulation resistance of 11.0 or more in terms of log IR. Furthermore, the temperature characteristics of the dielectric constant is within the range of ±15% over a wide temperature range of −55° C. to +125° C. with reference to a capacitance value at 25° C.

Furthermore, a dielectric ceramic composition and a laminated ceramic capacitor are proposed in Patent Document 4. The dielectric ceramic composition principally contains barium titanate and accessorily contains the following elements: Re (Re represents at least one rare-earth element selected from Y, Sm, Eu, Gd, Tb, Dy, Ho, Er, Tm, and Yb), Ca, Mg, and Si. The chemical composition formula of the dielectric ceramic composition is represented by $100Ba_m$-$TiO_3+aReO_{3/2}+bCaO+cMgO+dSiO_2$. (wherein the coefficients of 100, a, b, c, and d represent molar amounts), wherein the coefficients 100, a, b, c, and d satisfy the respective relationships: $0.990 \leq m \leq 1.030$, $0.5 \leq a \leq 6.0$, $0.10 \leq b \leq 5.00$, $0.010 \leq c \leq 1.000$, and $0.05 \leq d \leq 2.00$, respectively.

The dielectric ceramic composition has a dielectric constant of 3,000 or more, meets the B characteristics of JIS and X7R characteristics of EIA, and has a long accelerated insulation resistance life under high temperature and high voltage, thus resulting in excellent reliability even when the thickness of the dielectric ceramic composition is reduced.

Patent Document 1: Japanese Unexamined Patent Application Publication No. 5-9066 (claims and paragraph No. [0009])

Patent Document 2: Japanese Unexamined Patent Application Publication No. 5-9067 (claims and paragraph No. [0009])

Patent Document 3: Japanese Unexamined Patent Application Publication No. 5-9068 (claims and paragraph No. [0009])

Patent Document 4: Japanese Patent Application No. 2001-39765 (claims and paragraph Nos. [0066] and [0067]).

In recent years, in the development of electronic technology, rapid progress has been made in the miniaturization of electronic components, and trends toward miniaturization and higher capacities of laminated ceramic capacitors have become significant. However, conventional dielectric ceramic compositions are designed on the premise that the compositions are used under low field strength. As a result, the use of a thin layer of the dielectric ceramic composition under high field strength has disadvantages of significant reductions in insulation resistance, dielectric strength, and reliability. Therefore, when the thickness of a ceramic dielectric layer is reduced in the conventional dielectric ceramic composition, it is necessary to reduce the rated voltage depending on the thickness.

In each of dielectric ceramic compositions proposed in Patent Documents 1 to 4, it is possible to provide a laminated ceramic capacitor having excellent reliability by constituting a dielectric ceramic layer composed of the dielectric ceramic composition. However, when the thickness of the dielectric ceramic layer is reduced to about 1 μm, it is disadvantageously difficult to secure the reliability of the resulting laminated ceramic capacitor.

The present invention is accomplished to overcome the above-described problems. It is an object of the present invention to provide a dielectric ceramic composition and a laminated ceramic capacitor having a high dielectric constant of 3,000 or more, a small dielectric loss of 5% or less, a temperature characteristic of the dielectric constant meeting the B properties (the rate of change of capacitance with reference to a capacitance at 20° C. is within the range of ±10% between −25° C. to +85° C.), a high resistivity of $10^{11}$ Ωm or more, and high reliability, i.e., a mean failure time of 100 hours or more in an accelerated reliability test (150° C., DC field strength: 10 V/μm), even when the thickness of the dielectric ceramic layer is reduced to about 1 μm.

DISCLOSURE OF INVENTION

According to a first aspect of the present invention, in a dielectric ceramic composition represented by a chemical composition formula: $100(Ba_{1-x}Ca_x)_mTiO_3+aMnO+bCuO+cSiO_2+dRe_2O_3$ (wherein coefficients 100, a, b, c, and d each represent a molar ratio; and Re represents at least one element selected from Y, Sm, Eu, Gd, Tb, Dy, Ho, Er, Tm, and Yb), m, x, a, b, c, and d satisfy the respective relationships: $0.990 \leq m \leq 1.030$, $0.04 \leq x \leq 0.20$, $0.01 \leq a \leq 5$, $0.05 \leq b \leq 5$, $0.2 \leq c \leq 8$, and $0.05 \leq d \leq 2.5$.

According to a second aspect of the present invention, a laminated ceramic capacitor includes a plurality of laminated dielectric ceramic layers; internal electrodes, each being disposed between dielectric ceramic layers; and external electrodes electrically connected to the respective internal electrodes, wherein the dielectric ceramic layers are composed of the dielectric ceramic composition according to the first aspect.

According to a third aspect of the present invention, each of the internal electrodes in the laminated ceramic capacitor according to the second aspect is composed of at least one conductive material selected from nickel, a nickel alloy, copper, and a copper alloy.

BEST MODE FOR CARRYING OUT THE INVENTION

Figure 1:
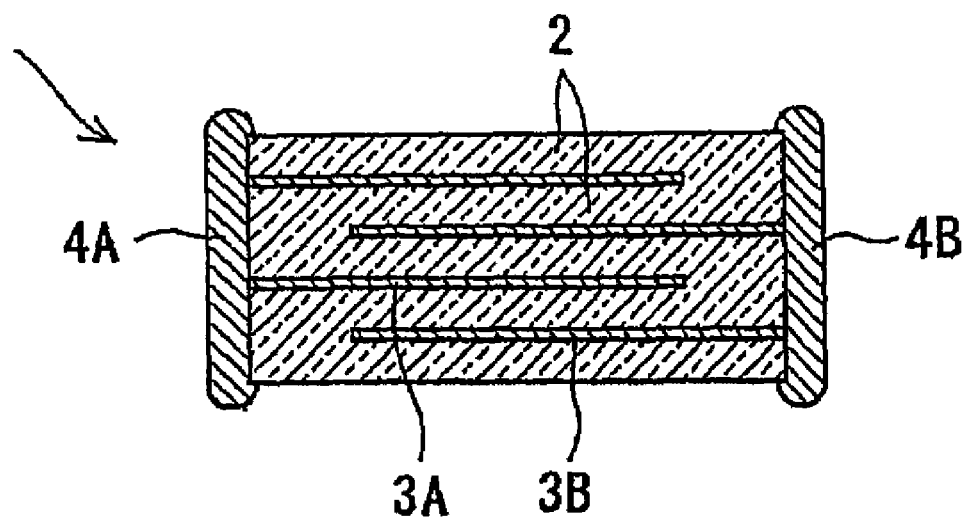
FIG. 1 is a cross-sectional view of a laminated ceramic capacitor according to an embodiment of the present invention.

The present invention will be described below with reference to FIG. 1. For example, as shown in FIG. 1, a laminated ceramic capacitor 1 in this embodiment includes a plurality of dielectric ceramic layers 2 (5 layers in this embodiment); a laminate containing a plurality of first internal electrodes 3A and a plurality of second internal electrodes 3B, each of the first internal electrodes 3A being disposed between the dielectric ceramic layers 2, and each of the second internal electrode 3B being disposed between the dielectric ceramic layers 2; and a first external electrode 4A disposed at one end of the laminate and electrically connected to the first internal electrode 3A, and a second external electrode 4B disposed at the other end of the laminate and electrically connected to the second internal electrode 3B.

As shown in FIG. 1, the first internal electrode 3A extends from one end of the dielectric ceramic layer 2 (left end in FIG. 1) to the vicinity of the other end (right end), and the second internal electrode 3B extends from the right end of the dielectric ceramic layer 2 to the vicinity of the left end. The first and second internal electrodes 3A and 3B are each composed of a conductive material. Any one of base metals selected from nickel, nickel alloys, copper, copper alloys, and the like can be preferably used as the conductive material. Furthermore, to prevent the structural defects in the internal electrodes, a small amount of a ceramic powder may be incorporated in the conductive material.

As shown in FIG. 1, the first external electrode 4A is electrically connected to the first internal electrode 3A in the laminate, and the second external electrode 4B is electrically connected to the second internal electrode 3B in the laminate. Each of the first and second external electrodes 4A and 4B may be composed of any one of various known conductive materials, such as Ag, Pd, alloys of Ag and Pd, and copper. Each of the first and second external electrodes 4A and 4B may be appropriately formed by a known process.

Each of the dielectric ceramic layers 2 is composed of a dielectric ceramic composition according to this embodiment. This dielectric ceramic composition is a composite oxide represented by the following chemical composition formula: $100(Ba_{1-x}Ca_x)_mTiO_3+aMnO+bCuO+cSiO_2+dRe_2O_3$. The coefficients, i.e., 100, a, b, c, and d, of the components of the dielectric ceramic composition each represent a molar amount. Re represents at least one rare-earth element selected from V, Sm, Eu, Gd, Tb, Dy, Ho, Er, Tm, and Yb. Furthermore, m, x, a, b, c, and d in the chemical composition formula satisfy the respective relationships: $0.990 \leq m \leq 1.030$, $0.04 \leq x \leq 0.20$, $0.01 \leq a \leq 5$, $0.05 \leq b \leq 5$, $0.2 \leq c \leq 8$, and $0.05 \leq d \leq 2.5$.

$(Ba_{1-x}Ca_x)_mTiO_3$ is a compound in which Ba ions in barium titanate are partially replaced with Ca ions. A substitution rate x of Ca ions to Ba ions less than 0.04 (substitution rate: 4%) is not preferable because the mean failure time in a high-temperature load test is shorter than 100 hours. A substitution rate x exceeding 0.20 (substitution rate: 20%) is also not preferable because the dielectric constant is lower than 3,000, and the rate of change of the dielectric constant with respect to temperature is disadvantageously outside the range of ±10%. A ratio of $Ba_{1-x}Ca_x$ to Ti ($m=Ba_{1-x}Ca_x/Ti$) less than 0.990 is not preferable because the resistivity is lower than $10^{11}$ Ωm. The ratio m exceeding 1.030 is also not preferable because the dielectric constant is lower than 3,000, the rate of change of the dielectric constant with respect to temperature is disadvantageously outside the range of ±10%, and the mean failure time is reduced.

A molar amount a of MnO less than 0.01 relative to 100 of $(Ba_{1-x}Ca_x)_mTiO_3$ is not preferable because the resistivity is lower than $10^{11}$ Ωm. A molar amount a exceeding 5 is also not preferable because the rate of change of the dielectric constant with respect to temperature is disadvantageously outside the range of ±10%, and the resistivity is lower than $10^{11}$ Ωm.

A molar amount b of CuO less than 0.05 is not preferable because the mean failure time is shorter than 100 hours. A molar amount b exceeding 5 is also not preferable because the rate of change of the dielectric constant with respect to temperature is disadvantageously outside the range of ±10%.

A molar amount c of $SiO_2$ less than 0.2 is not preferable because the dielectric constant is lower than 3,000, the dielectric loss tan δ is higher than 5%, the rate of change of the dielectric constant with respect to temperature is disadvantageously outside the range of ±10%, and the mean failure time is shorter than 100 hours. A molar amount c exceeding 8 is also not preferable because the rate of change of the dielectric constant with respect to temperature is disadvantageously 10% or more, and the mean failure time is shorter than 100 hours.

A molar amount d of $Re_2O_3$ less than 0.05 is not preferable because the mean failure time is shorter than 100 hours. A molar amount d exceeding 2.5 is also not preferable because the rate of change of the dielectric constant with respect to temperature is disadvantageously outside the range of ±10%. When a plurality of types of rare-earth elements Re are contained, the total of molar amounts of the plurality of types of the rare-earth elements Re is defined as d.

The process for producing a material powder used in the dielectric ceramic composition is not particularly limited, and any production process can be employed as long as the compound represented by $(Ba_{1-x}Ca_x)_mTiO_3$ can be realized.

For example, the compound represented by $(Ba_{1-x}Ca_x)_mTiO_3$ can be produced by a step of mixing $BaCO_3$, $TiO_2$, and $CaCO_3$ and then a step of reacting $BaCO_3$, $TiO_2$, and $CaCO_3$ by heat treatment.

The material powder of the dielectric ceramic composition can be produced by a step of mixing the compound represented by $(Ba_{1-x}Ca_x)_mTiO_3$ and oxides of Mn, Cu, Si, and Re (wherein Re represents at least one rare-earth element selected from Y, Sm, Eu, Gd, Tb, Dy, Ho, Er, Tm, and Yb), which are additional components.

Furthermore, examples of the production process of the compound represented by $(Ba_{1-x}Ca_x)_mTiO_3$ include hydrothermal synthesis, hydrolysis, and wet synthesis such as a sol-gel method.

The starting materials of Mn, Cu, Si, Re (wherein Re represents at least one rare-earth element selected from Y, Sm, Eu, Gd, Tb, Dy, Ho, Er, Tm, and Yb), which are additional components, are not limited to powdery oxides as long as a dielectric ceramic according to the present invention can be produced. A carbonate or a solution of an alkoxide, an organometallic compound, or the like may be used. There is no deterioration of the characteristics obtained by using these materials.

Such material powders are fired to produce the above-described dielectric ceramic composition.

By using the above-described dielectric ceramic composition, it is possible to produce a laminated ceramic capacitor having a high dielectric constant of 3,000 or more, a small dielectric loss of 5% or less, a temperature characteristic of the dielectric constant meeting the B properties (within ±10%), a high resistivity of $10^{11}$ Ωm or more, and high reliability, i.e., a mean failure time of 100 hours or more in an accelerated reliability test (high-temperature load test), even when the thickness of the dielectric ceramic layer is reduced to about 1 μm. Therefore, it is possible to produce a laminated ceramic capacitor in which the rated voltage need not be reduced even when the thickness of the dielectric ceramic layer is reduced to about 1 µm, the laminated ceramic capacitor being capable of achieving further miniaturization and higher capacitances in the future.

Furthermore, in the laminated ceramic capacitor in this embodiment, the internal electrode can be composed of a base metal, such as nickel, a nickel alloy, copper, or a copper alloy, because the laminated ceramic capacitor can be fired in a reducing atmosphere.

The present invention will be described below on the basis of specific examples.

EXAMPLE 1

In this example, after preparing the material powder of a dielectric ceramic composition, a laminated ceramic capacitor was produced with the material powder. First, highly pure $TiO_2$, $BaCO_3$, and $CaCO_3$, which were starting materials, were prepared. These starting materials were weighed in a manner such that Ti, Ba, and Ca were contained in amounts represented by samples A to N shown in Table 1 and then were mixed and pulverized to produce powders. These powders were dried and then heated at 1,000° C. or more to synthesize $(Ba,Ca)TiO_3$ material powders having compositions represented by samples A to N shown in Table 1 and each having an average particle size of 0.20 µm. In addition, a CuO powder, an $MnCO_3$ powder, an $SiO_2$ powder, and an $Re_2O_3$ powder (wherein Re represents at least one rare-earth element selected from Y, Sm, Eu, Gd, Tb, Dy, Ho, Er, Tm, and Yb), which were other material powders, were prepared. In Table 1, asterisk-marked powders A to D were powders in which x and m were outside the range of the present invention.

TABLE 1

$(Ba_{1-x}Ca_x)_mTiO_3$

| Powder | x | m |
|---|---|---|
| *A | 0.038 | 1.003 |
| *B | 0.22 | 1.005 |
| *C | 0.08 | 0.988 |
| *D | 0.10 | 1.032 |
| E | 0.08 | 1.001 |
| F | 0.042 | 1.001 |
| G | 0.05 | 1.011 |
| H | 0.08 | 1.004 |
| I | 0.14 | 1.007 |
| J | 0.17 | 1.02 |
| K | 0.19 | 1.005 |
| L | 0.08 | 0.992 |
| M | 0.08 | 1.015 |
| N | 0.08 | 1.027 |

Subsequently, the powders were weighed in a manner such that compositions shown in Tables 2 and 3 were achieved, and then mixed to obtain mixtures represented by sample Nos. 1 to 69. Then, these mixtures were calcined in the range of 1,000° C. to 1050° C. for 2 hours to obtain calcines. A polyvinyl butyral binder and an organic solvent such as ethanol were added to each calcine, and the resulting mixtures were wet-mixed with ball mills to prepare ceramic slurries. Each of the resulting ceramic slurries was formed into a sheet form by a doctor blade method to obtain a rectangular ceramic green sheet having a thickness of 1.4 µm. Next, a conductive paste principally composed of nickel (Ni) was applied onto each of the resulting ceramic green sheets by printing to provide a conductive paste film for forming an internal electrode. One end of the conductive paste film is disposed at a first end of the ceramic green sheet, and the other end of the conductive paste film was disposed away from a second end of the ceramic green sheet. In Table 2, asterisk-marked sample Nos. 1 to 12 were samples in which any one of x, m, a, b, c, and d was outside the limited range of the present invention.

TABLE 2

$100(Ba_{1-x}Ca_x)_mTiO_3 + aMnO + bCuO + cSiO_2 + dRe_2O_3$

| Sample | Rare-earth element | Powder used | x | m | a | b | c | d |
|---|---|---|---|---|---|---|---|---|
| *No. 1 | Y | A | 0.038 | 1.003 | 0.200 | 0.400 | 2.00 | 0.5 |
| *No. 2 | Y | B | 0.22 | 1.005 | 0.200 | 0.400 | 2.00 | 0.5 |
| *No. 3 | Y | C | 0.08 | 0.988 | 0.200 | 0.400 | 2.00 | 0.5 |
| *No. 4 | Y | D | 0.10 | 1.032 | 0.200 | 0.400 | 2.00 | 0.5 |
| *No. 5 | Y | E | 0.08 | 1.001 | 0.005 | 0.400 | 2.00 | 0.5 |
| *No. 6 | Y | E | 0.08 | 1.001 | 5.200 | 0.400 | 2.00 | 0.5 |
| *No. 7 | Y | E | 0.08 | 1.001 | 0.200 | 0.04 | 2.00 | 0.5 |
| *No. 8 | Y | E | 0.08 | 1.001 | 0.200 | 5.300 | 2.00 | 0.5 |
| *No. 9 | Y | E | 0.08 | 1.001 | 0.200 | 0.400 | 0.10 | 0.5 |
| *No. 10 | Y | E | 0.08 | 1.001 | 0.200 | 0.400 | 8.20 | 0.5 |
| *No. 11 | Y | E | 0.08 | 1.001 | 0.200 | 0.400 | 2.00 | 0.04 |
| *No. 12 | Y | E | 0.08 | 1.001 | 0.200 | 0.400 | 2.00 | 2.6 |
| No. 13 | Y | F | 0.042 | 1.001 | 0.200 | 0.400 | 2.00 | 0.5 |
| No. 14 | Y | G | 0.05 | 1.011 | 0.200 | 0.400 | 2.00 | 0.5 |
| No. 15 | Y | H | 0.08 | 1.004 | 0.200 | 0.400 | 2.00 | 0.5 |
| No. 16 | Y | I | 0.14 | 1.007 | 0.200 | 0.400 | 2.00 | 0.5 |
| No. 17 | Y | J | 0.17 | 1.02 | 0.200 | 0.400 | 2.00 | 0.5 |
| No. 18 | Y | K | 0.19 | 1.005 | 0.200 | 0.400 | 2.00 | 0.5 |
| No. 19 | Y | L | 0.08 | 0.992 | 0.200 | 0.400 | 2.00 | 0.5 |
| No. 20 | Y | M | 0.08 | 1.015 | 0.200 | 0.400 | 2.00 | 0.5 |
| No. 21 | Y | N | 0.08 | 1.027 | 0.200 | 0.400 | 2.00 | 0.5 |
| No. 22 | Y | E | 0.08 | 1.001 | 0.012 | 0.400 | 2.00 | 0.5 |
| No. 23 | Y | E | 0.08 | 1.001 | 0.100 | 0.400 | 2.00 | 0.5 |
| No. 24 | Y | E | 0.08 | 1.001 | 0.400 | 0.400 | 2.00 | 0.5 |
| No. 25 | Y | E | 0.08 | 1.001 | 0.700 | 0.400 | 2.00 | 0.5 |
| No. 26 | Y | E | 0.08 | 1.001 | 1.000 | 0.400 | 2.00 | 0.5 |
| No. 27 | Y | E | 0.08 | 1.001 | 2.000 | 0.400 | 2.00 | 0.5 |
| No. 28 | Y | E | 0.08 | 1.001 | 3.500 | 0.400 | 2.00 | 0.5 |
| No. 29 | Y | E | 0.08 | 1.001 | 4.800 | 0.400 | 2.00 | 0.5 |
| No. 30 | Y | E | 0.08 | 1.001 | 0.200 | 0.055 | 2.00 | 0.5 |
| No. 31 | Y | E | 0.08 | 1.001 | 0.200 | 0.100 | 2.00 | 0.5 |
| No. 32 | Y | E | 0.08 | 1.001 | 0.200 | 0.700 | 2.00 | 0.5 |
| No. 33 | Y | E | 0.08 | 1.001 | 0.200 | 1.000 | 2.00 | 0.5 |
| No. 34 | Y | E | 0.08 | 1.001 | 0.200 | 2.500 | 2.00 | 0.5 |
| No. 35 | Y | E | 0.08 | 1.001 | 0.200 | 4.700 | 2.00 | 0.5 |

TABLE 3

$100(Ba_{1-x}Ca_x)_mTiO_3 + aMnO + bCuO + cSiO_2 + dRe_2O_3$

| Sample | Rare-earth element | Powder used | x | m | a | b | c | d |
|---|---|---|---|---|---|---|---|---|
| No. 36 | Y | E | 0.08 | 1.001 | 0.200 | 0.400 | 0.25 | 0.5 |
| No. 37 | Y | E | 0.08 | 1.001 | 0.200 | 0.400 | 0.50 | 0.5 |
| No. 38 | Y | E | 0.08 | 1.001 | 0.200 | 0.400 | 1.00 | 0.5 |
| No. 39 | Y | E | 0.08 | 1.001 | 0.200 | 0.400 | 4.00 | 0.5 |
| No. 40 | Y | E | 0.08 | 1.001 | 0.200 | 0.400 | 6.00 | 0.5 |
| No. 41 | Y | E | 0.08 | 1.001 | 0.200 | 0.400 | 7.80 | 0.5 |
| No. 42 | Y | E | 0.08 | 1.001 | 0.200 | 0.400 | 2.00 | 0.055 |
| No. 43 | Y | E | 0.08 | 1.001 | 0.200 | 0.400 | 2.00 | 0.2 |
| No. 44 | Y | E | 0.08 | 1.001 | 0.200 | 0.400 | 2.00 | 0.7 |
| No. 45 | Y | E | 0.08 | 1.001 | 0.200 | 0.400 | 2.00 | 1 |
| No. 46 | Y | E | 0.08 | 1.001 | 0.200 | 0.400 | 2.00 | 2 |
| No. 47 | Y | E | 0.08 | 1.001 | 0.200 | 0.400 | 2.00 | 2.45 |
| No. 48 | Sm | E | 0.08 | 1.001 | 0.200 | 0.400 | 2.00 | 0.5 |
| No. 49 | Sm | E | 0.08 | 1.001 | 0.200 | 0.400 | 2.00 | 1.5 |
| No. 50 | Eu | E | 0.08 | 1.001 | 0.200 | 0.400 | 2.00 | 0.5 |
| No. 51 | Eu | E | 0.08 | 1.001 | 0.200 | 0.400 | 2.00 | 1.5 |
| No. 52 | Gd | E | 0.08 | 1.001 | 0.200 | 0.400 | 2.00 | 0.5 |
| No. 53 | Gd | E | 0.08 | 1.001 | 0.200 | 0.400 | 2.00 | 1.5 |
| No. 54 | Tb | E | 0.08 | 1.001 | 0.200 | 0.400 | 2.00 | 0.5 |

TABLE 3-continued $100(Ba_{1-x}Ca_x)_mTiO_3 + aMnO + bCuO + cSiO_2 + dRe_2O_3$

| Sample | Rare-earth element | Powder used | x | m | a | b | c | d |
|---|---|---|---|---|---|---|---|---|
| No. 55 | Tb | E | 0.08 | 1.001 | 0.200 | 0.400 | 2.00 | 1.5 |
| No. 56 | Dy | E | 0.08 | 1.001 | 0.200 | 0.400 | 2.00 | 0.5 |
| No. 57 | Dy | E | 0.08 | 1.001 | 0.200 | 0.400 | 2.00 | 1.5 |
| No. 58 | Ho | E | 0.08 | 1.001 | 0.200 | 0.400 | 2.00 | 0.5 |
| No. 59 | Ho | E | 0.08 | 1.001 | 0.200 | 0.400 | 2.00 | 1.5 |
| No. 60 | Er | E | 0.08 | 1.001 | 0.200 | 0.400 | 2.00 | 0.5 |
| No. 61 | Er | E | 0.08 | 1.001 | 0.200 | 0.400 | 2.00 | 1.5 |
| No. 62 | Tm | E | 0.08 | 1.001 | 0.200 | 0.400 | 2.00 | 0.5 |
| No. 63 | Tm | E | 0.08 | 1.001 | 0.200 | 0.400 | 2.00 | 1.5 |
| No. 64 | Yb | E | 0.08 | 1.001 | 0.200 | 0.400 | 2.00 | 0.5 |
| No. 65 | Yb | E | 0.08 | 1.001 | 0.200 | 0.400 | 2.00 | 1.5 |
| No. 66 | Y, Gd | E | 0.08 | 1.001 | 0.200 | 0.400 | 2.00 | 0.25 each |
| No. 67 | Y, Gd | E | 0.08 | 1.001 | 0.200 | 0.400 | 2.00 | 1 each |
| No. 68 | Dy, Yb | E | 0.08 | 1.001 | 0.200 | 0.400 | 2.00 | 0.5 each |
| No. 69 | Dy, Yb | E | 0.08 | 1.001 | 0.200 | 0.400 | 2.00 | 0.5 each |

Next, a plurality of the ceramic green sheets that were the same type were stacked in a manner such that the first end, in which the conductive paste films were disposed, and the second end were alternately disposed. The resulting stack was interposed between ceramic green sheets each having no conducting paste film and then was subjected to press bonding to obtain a laminate. The resulting laminate was heated to 350° C. in an $N_2$ atmosphere to decompose the binder and then fired for 2 hours in a reducing atmosphere containing an $H_2$ gas, an $N_2$ gas, and an $H_2O$ gas and having an oxygen partial pressure of $10^{-9}$ to $10^{-12}$ MPa at the temperature shown in Tables 4 and 5.

TABLE 4

| Sample | Firing temperature (° C.) | Dielectric constant ($\epsilon_r$) | Dielectric loss tan δ (%) | Rate of change of dielectric constant with temperature (%) | Resistivity Log ρ (ρ:Ωm) | Mean failure time (hour) |
|---|---|---|---|---|---|---|
| *No. 1 | 1150 | 3420 | 4.1 | −7.1 | 11.5 | 20 |
| *No. 2 | 1150 | 2700 | 4.2 | −11.1 | 11.5 | 40 |
| *No. 3 | 1150 | 3200 | 3.5 | −7.5 | 9.3 | Unmeasurable |
| *No. 4 | 1150 | 2400 | 12.5 | −12.8 | 9.5 | Unmeasurable |
| *No. 5 | 1150 | 3100 | 4.3 | −9.4 | 9.4 | Unmeasurable |
| *No. 6 | 1100 | 3280 | 5.8 | −12.1 | 10.5 | 20 |
| *No. 7 | 1250 | 3310 | 4.4 | −7.2 | 11.5 | 10 |
| *No. 8 | 1150 | 3380 | 4.1 | −12.3 | 11.4 | 150 |
| *No. 9 | 1150 | 2400 | 7.8 | −12.5 | 9.5 | 15 |
| *No. 10 | 1150 | 3250 | 4.1 | −11.8 | 11.5 | 40 |
| *No. 11 | 1150 | 3250 | 4.2 | −6.5 | 11.3 | 5 |
| *No. 12 | 1150 | 3600 | 4.8 | −11.2 | 11.2 | 120 |
| No. 13 | 1150 | 3450 | 4.4 | −7.5 | 11.4 | 110 |
| No. 14 | 1150 | 3500 | 4.7 | −7.2 | 11.3 | 140 |
| No. 15 | 1150 | 3620 | 4.8 | −6.9 | 11.4 | 170 |
| No. 16 | 1150 | 3400 | 4.1 | −6.1 | 11.2 | 230 |
| No. 17 | 1150 | 3210 | 3.7 | −8.5 | 11.3 | 150 |
| No. 18 | 1150 | 3150 | 3.4 | −9.1 | 11.5 | 115 |
| No. 19 | 1150 | 3210 | 3.8 | −7.8 | 11.1 | 110 |
| No. 20 | 1150 | 3150 | 3.7 | −8.5 | 11.3 | 130 |
| No. 21 | 1150 | 3200 | 3.4 | −8.9 | 11.5 | 140 |
| No. 22 | 1150 | 3230 | 4.2 | −5.4 | 11.1 | 115 |
| No. 23 | 1150 | 3300 | 4.1 | −6.1 | 11.3 | 120 |
| No. 24 | 1150 | 3310 | 3.7 | −5.8 | 11.5 | 140 |
| No. 25 | 1150 | 3250 | 3.6 | −5.7 | 11.3 | 160 |
| No. 26 | 1125 | 3380 | 3.6 | −6.5 | 11.1 | 175 |
| No. 27 | 1125 | 3250 | 3.3 | −7.8 | 11.4 | 200 |
| No. 28 | 1100 | 3280 | 3.1 | −8.8 | 11.5 | 170 |
| No. 29 | 1100 | 3300 | 3.2 | −9.4 | 11.4 | 120 |
| No. 30 | 1150 | 3100 | 3.8 | −8.1 | 11.3 | 105 |
| No. 31 | 1150 | 3280 | 3.2 | −7.5 | 11.1 | 130 |
| No. 32 | 1150 | 3300 | 4.1 | −7.2 | 11.2 | 170 |
| No. 33 | 1150 | 3350 | 3.8 | −7.5 | 11.5 | 150 |

TABLE 5

| Sample | Firing temperature (° C.) | Dielectric constant ($\epsilon_r$) | Dielectric loss tan δ (%) | Rate of change of dielectric constant with temperature (%) | Resistivity (ρ:Ωm) | Mean failure time (hour) |
|---|---|---|---|---|---|---|
| No. 34 | 1150 | 3310 | 3.5 | −9.0 | 11.4 | 160 |
| No. 35 | 1150 | 3120 | 3.2 | −9.6 | 11.3 | 150 |

TABLE 5-continued

| Sample | Firing temperature (° C.) | Dielectric constant ($\epsilon_r$) | Dielectric loss tan δ (%) | Rate of change of dielectric constant with temperature (%) | Resistivity (ρ:Ωm) | Mean failure time (hour) |
|---|---|---|---|---|---|---|
| No. 36 | 1175 | 3050 | 4.5 | −9.1 | 11.1 | 110 |
| No. 37 | 1175 | 3200 | 4.1 | −8.5 | 11.3 | 130 |
| No. 38 | 1150 | 3300 | 3.5 | −8.1 | 11.2 | 150 |
| No. 39 | 1150 | 3350 | 3.1 | −7.5 | 11.4 | 150 |
| No. 40 | 1100 | 3500 | 3.8 | −8.1 | 11.1 | 130 |
| No. 41 | 1100 | 3320 | 3.7 | −8.5 | 11.1 | 115 |
| No. 42 | 1150 | 3380 | 4.1 | −7.1 | 11.5 | 110 |
| No. 43 | 1150 | 3350 | 4.0 | −7.5 | 11.4 | 115 |
| No. 44 | 1150 | 3370 | 3.5 | −7.8 | 11.4 | 120 |
| No. 45 | 1150 | 3250 | 3.1 | −8.5 | 11.3 | 150 |
| No. 46 | 1150 | 3100 | 3.8 | −8.8 | 11.1 | 210 |
| No. 47 | 1150 | 3050 | 4.5 | −9.5 | 11.1 | 230 |
| No. 48 | 1150 | 3310 | 4.3 | −8.3 | 11.4 | 110 |
| No. 49 | 1150 | 3070 | 3.5 | −9.1 | 11.2 | 170 |
| No. 50 | 1150 | 3290 | 4.2 | −8.5 | 11.5 | 115 |
| No. 51 | 1150 | 3090 | 3.2 | −9.2 | 11.3 | 185 |
| No. 52 | 1150 | 3300 | 4.1 | −7.7 | 11.4 | 120 |
| No. 53 | 1150 | 3100 | 3.3 | −9.6 | 11.1 | 190 |
| No. 54 | 1150 | 3450 | 4.2 | −8.0 | 11.3 | 120 |
| No. 55 | 1175 | 3210 | 3.3 | −9.4 | 11.2 | 195 |
| No. 56 | 1150 | 3300 | 4.3 | −8.1 | 11.4 | 110 |
| No. 57 | 1150 | 3100 | 3.2 | −9.1 | 11.1 | 220 |
| No. 58 | 1150 | 3330 | 4.1 | −7.8 | 11.5 | 115 |
| No. 59 | 1150 | 3060 | 3.5 | −9.2 | 11.1 | 240 |
| No. 60 | 1150 | 3320 | 4.3 | −7.7 | 11.3 | 115 |
| No. 61 | 1150 | 3050 | 3.1 | −9.6 | 11.1 | 190 |
| No. 62 | 1150 | 3310 | 4.4 | −7.8 | 11.4 | 110 |
| No. 63 | 1150 | 3050 | 3.1 | −9.2 | 11.1 | 180 |
| No. 64 | 1150 | 3380 | 4.5 | −7.5 | 11.5 | 120 |
| No. 65 | 1150 | 3120 | 3.0 | −9.4 | 11.1 | 185 |
| No. 66 | 1150 | 3450 | 4.2 | −7.9 | 11.4 | 110 |
| No. 67 | 1150 | 3110 | 3.1 | −9.1 | 11.1 | 200 |
| No. 68 | 1150 | 3450 | 4.3 | −7.7 | 11.5 | 115 |
| No. 69 | 1150 | 3100 | 3.2 | −9.5 | 11.1 | 195 |

A silver paste containing a $B_2O_3$—$SiO_2$—BaO-based glass frit was applied to both ends of the fired laminate and baked at 600° C. in an $N_2$ atmosphere to form external electrodes each electrically connected to the internal electrode. Thereby, a laminated ceramic capacitor including the dielectric ceramic composition of the present invention was obtained.

Outer dimensions of each of the resulting laminated ceramic capacitors (sample Nos. 1 to 69) were 5.0 mm in width, 5.7 mm in length, and 2.4 mm in thickness. The thickness of each of the dielectric ceramic layers was 1.0 μm. The number of effective dielectric ceramic layers was 5 layers. The area of each of the facing electrodes was $16.3 \times 10^{-6}$ $m^2$ per layer.

Next, electrical characteristics, which indicate the performance of the laminated ceramic capacitor, of sample Nos. 1 to 69 were measured.

Capacitance C and dielectric loss tan δ were measured with an automatic bridge measurement according to JIS 5102. Dielectric constant $\epsilon_r$ was calculated from the resulting capacitance C. Tables 4 and 5 show the results.

To measure insulation resistance IR, an insulation resistance tester was used. That is, 4 V DC was applied for 1 minute, and insulation resistance IR was measured at +25° C., and then resistivity ρ was calculated. Tables 4 and 5 show the results as log ρ.

With respect to the rate of change of capacitance C with temperature, the rate of change $\Delta C/C_{20° C.}$ in the range of −25° C. to +85° C. with reference to the capacitance at 20° C. was determined. Tables 4 and 5 show the results as the rate of change of the dielectric constant with respect to temperature.

With respect to a high-temperature load test, 10 V DC was applied at 150° C., and the change in insulation resistance IR with time was measured. In the high-temperature load test, the state in which the insulation resistance IR of each sample reached $10^5$ Ω or less was defined as failure. After a time required for reaching the failure was measured, a mean failure time was determined. Tables 4 and 5 show the results.

As is clear from the measurement results shown in Tables 4 and 5, any one of the laminated ceramic capacitors (sample Nos. 13 to 69), each including the dielectric ceramic composition having the composition within the range of the present invention, was found to be a highly reliable laminated ceramic capacitor having a mean failure time of 100 hours or more in the high-temperature load test, a high dielectric constant $\epsilon_r$ of 3,000 or more, a small dielectric loss tan δ of 5% or less, a rate of change of the dielectric constant meeting the B properties (within ±10%), and a high resistivity ρ of $10^{11}$ Ωm (a log ρ of 11) or more, in spite of the fact that the thickness of the dielectric ceramic layer was reduced to about 1 μm.

Furthermore, as is clear from the case of sample Nos. 66 to 69, when the amount d, which was the total of the molar amounts of the oxides of two rare-earth elements, was within the range of $0.05 \leq d \leq 2.5$ relative to 100 of $(Ba,Ca)TiO_3$, it was possible to obtain a laminated ceramic capacitor having satisfactory electrical characteristics in the same way as for sample Nos. 13 to 65, even when the thickness of the dielectric ceramic layer was reduced to about 1 μm.

In contrast, as is clear from the measurement results of sample Nos. 1 to 12 shown in Table 4, it was found that if any one of contents of the oxides was outside the limited range of the present invention, the resulting laminated ceramic capacitor had degraded performance even if each of the contents of the other oxides was within the limited range of the present invention, as described below.

In the case of sample No. 1 using powder A in which Ba ions in $(Ba_{1-x}Ca_x)_mTiO_3$ were partially replaced with Ca ions and the substitution rate x of Ca ions was less than 0.04, the mean failure time in the high-temperature load test was 20 hours, which was very short. In the case of sample No. 2 using powder B in which the substitution rate x exceeded 0.20, the dielectric constant $\epsilon_r$ was disadvantageously 2,700, which was lower than 3,000, the rate of change of the dielectric constant with respect to temperature was disadvantageously −11.1%, and the mean failure time was 40 hours, which was short.

In the case of sample No. 3 using powder C in which the ratio m, i.e., $Ba_{1-x}Ca_x/Ti$, was less than 0.990, the logarithm of resistivity was 9.3, i.e., the resistivity was lower than $10^{11}$ Ωm, and the mean failure time could not be measured, which was terrible. In the case of sample No. 4 using powder D in which the ratio m exceeded 1.03, the dielectric constant $\epsilon_r$ was 2,400, which was worse than 3,000, the dielectric loss tan δ was 12.5%, which was lower than 5%, the rate of change of the dielectric constant with respect to temperature was −12.8%, which was worse than ±10%, and the mean failure time could not be measured, which was terrible.

In the case of sample No. 5 in which the molar amount a of MnO was less than 0.01 relative to 100 of $(Ba_{1-x}Ca_x)_mTiO_3$, the resistivity was lower than $10_{11}$ Ωm, and the mean failure time could not be measured, which was terrible. In the case of sample No. 6 in which the molar amount a exceeded 5, the rate of change of the dielectric constant with respect to temperature was −12.1%, which was worse than ±10%, the resistivity was lower than $10_{11}$ Ωm, and the mean failure time was 20 hours, which was very short.

In the case of sample No. 7 in which the molar amount b of CuO was less than 0.05, the mean failure time was 10 hours, which was very short. In the case of sample No. 8 in which the molar amount b exceeded 5, the rate of change of the dielectric constant with respect to temperature was −12.3%, which was worse than ±10%.

In the case of sample No. 9 in which the molar amount c of $SiO_2$ was less than 0.2, the dielectric constant was 2,400, which was low, the dielectric loss tan δ was greater than 7.8%, the rate of change of the dielectric constant with respect to temperature was −12.5%, which was poor, and the mean failure time was 15 hours, which was very short. In the case of sample No. 10 in which the molar amount c exceeded 8, the rate of change of the dielectric constant with respect to temperature was −11.8%, which was poor, and the mean failure time was 40 hours, which was short.

In the case of sample No. 11 in which the molar amount d of $Re_2O_3$ was less than 0.05, the mean failure time was 5 hours, which was very short. In the case of sample No. 12 in which the molar amount d exceeded 2.5, the rate of change of the dielectric constant with respect to temperature was −11.2%, which was poor.

The present invention is not limited to the above-described examples. It is understood that various changes may be made without departing from the spirit of the invention. For example, at least one rare-earth element selected among a plurality of types of rare-earth elements is used. When a plurality of types of rare-earth elements are used, the total amount d of the molar amounts of oxides of the plurality of types of the rare-earth elements should satisfy the relationship: $0.05 \leq d \leq 2.5$.

According to the first to third aspects of the present invention, it is possible to provide a dielectric ceramic composition and a laminated ceramic capacitor having a high dielectric constant of 3,000 or more, a small dielectric loss of 5% or less, a temperature characteristic of the dielectric constant meeting the B properties, a high resistivity of $10^{11}$ Ωm or more, and high reliability, i.e., a mean failure time of 100 hours or more in an accelerated reliability test (150° C., DC field strength: 10 V/μm), even when the thickness of the dielectric ceramic layer is reduced to about 1 μm.

INDUSTRIAL APPLICABILITY

The present invention can be appropriately applied to produce a dielectric ceramic composition and a laminated ceramic capacitor.

The invention claimed is:

1. A dielectric ceramic composition represented by the chemical composition formula: $100(Ba_{1-x}Ca_x)_mTiO_3 + aMnO + bCuO + cSiO_2 + dRe_2O_3$ wherein coefficients 100, a, b, c, and d each represent a molar amount; Re represents at least one element selected from Y, Sm, Eu, Gd, Tb, Dy, Ho, Er, Tm, and Yb, and wherein m, x, a, b, c, and d satisfy the respective relationships: $0.990 \leq m \leq 1.030$, $0.04 \leq x \leq 0.20$, $0.01 \leq a \leq 5$, $0.05 \leq b \leq 5$, $0.2 \leq c \leq 8$, and $0.05 \leq d \leq 2.5$.

2. A laminated ceramic capacitor comprising: a plurality of laminated dielectric ceramic layers; at least two internal electrodes, each being disposed between a different pair of adjacent dielectric ceramic layers; and at least two external electrodes each of which is electrically connected to a different internal electrodes, wherein the dielectric ceramic layers comprise the dielectric ceramic composition according to claim 1.

3. The laminated ceramic capacitor according to claim 2, wherein each of the internal electrodes comprises at least one conductive material selected from the group consisting of nickel, a nickel alloy, copper, and a copper alloy.

4. The dielectric ceramic composition according to claim 1, wherein $0.992 \leq m \leq 1.027$, $0.042 \leq x \leq 0.19$, $0.1 \leq a \leq 4.8$, $0.055 \leq b \leq 4.7$, $0.25 \leq c \leq 7.8$, and $0.055 \leq d \leq 2.45$.

5. A laminated ceramic capacitor comprising: a plurality of laminated dielectric ceramic layers; at least two internal electrodes, each being disposed between a different pair of adjacent dielectric ceramic layers; and at least two external electrodes each of which is electrically connected to a different internal electrodes, wherein the dielectric ceramic layers comprise the dielectric ceramic composition according to claim 4.

6. The laminated ceramic capacitor according to claim 5, wherein each of the internal electrodes comprises at least one conductive material selected from the group consisting of nickel, a nickel alloy, copper, and a copper alloy.

7. The dielectric ceramic composition according to claim 1, wherein $1.001 \leq m \leq 1.011$, $0.08 \leq x \leq 0.17$, $0.2 \leq a \leq 3.5$, $0.1 \leq b \leq 2.5$, $0.5 \leq c \leq 6$, and $0.2 \leq d \leq 1.5$.

8. A laminated ceramic capacitor comprising: a plurality of laminated dielectric ceramic layers; at least two internal electrodes, each being disposed between a different pair of adjacent dielectric ceramic layers; and at least two external electrodes each of which is electrically connected to a different internal electrodes, wherein the dielectric ceramic layers comprise the dielectric ceramic composition according to claim 5.

9. The laminated ceramic capacitor according to claim 8, wherein each of the internal electrodes comprises at least one conductive material selected from the group consisting of nickel, a nickel alloy, copper, and a copper alloy.

10. The dielectric ceramic composition according to claim 1, wherein m is 1.001, x is 0.08, a is 0.2, b is 0.4, and c is 2.

11. A laminated ceramic capacitor comprising: a plurality of laminated dielectric ceramic layers; at least two internal electrodes, each being disposed between a different pair of adjacent dielectric ceramic layers; and at least two external electrodes each of which is electrically connected to a different internal electrodes, wherein the dielectric ceramic layers comprise the dielectric ceramic composition according to claim 6.

12. The laminated ceramic capacitor according to claim 11, wherein each of the internal electrodes comprises at least one conductive material selected from the group consisting of nickel, a nickel alloy, copper, and a copper alloy.

13. The dielectric ceramic composition according to claim 1, wherein Re is at least 2 of said elements.

14. A laminated ceramic capacitor comprising: a plurality of laminated dielectric ceramic layers; at least two internal electrodes, each being disposed between a different pair of adjacent dielectric ceramic layers; and at least two external electrodes each of which is electrically connected to a different internal electrodes, wherein the dielectric ceramic layers comprise the dielectric ceramic composition according to claim 13.

15. The laminated ceramic capacitor according to claim 14, wherein each of the internal electrodes comprises at least one conductive material selected from the group consisting of nickel, a nickel alloy, copper, and a copper alloy.

* * * * *